(12) United States Patent  (10) Patent No.: US 8,497,610 B2
Yao et al.                  (45) Date of Patent:     Jul. 30, 2013

(54) CEILING FAN MOTOR

(75) Inventors: Chao-Chin Yao, Taichung (TW); Kuo Tsun Lin, Taichung (TW)

(73) Assignee: Chao-Chin Yao, Taichung (TW)

( * ) Notice: Subject to any disclaimer, the term of this patent is extended or adjusted under 35 U.S.C. 154(b) by 71 days.

(21) Appl. No.: 13/291,795

(22) Filed: Nov. 8, 2011

(65) Prior Publication Data

US 2012/0139396 A1    Jun. 7, 2012

Related U.S. Application Data

(63) Continuation-in-part of application No. 12/960,769, filed on Dec. 6, 2010, now Pat. No. 8,314,523.

(51) Int. Cl.
*H02K 11/00*    (2006.01)

(52) U.S. Cl.
USPC .......................................... 310/68 B; 310/91

(58) Field of Classification Search
USPC .................. 310/68 C, 68 B, 91, 62, 214, 215, 310/90
See application file for complete search history.

(56) References Cited

U.S. PATENT DOCUMENTS

| 4,549,104 | A  | * | 10/1985 | Niimura et al. | 310/67 R |
| 5,610,464 | A  | * | 3/1997  | Asano et al.   | 310/156.45 |
| 7,332,840 | B2 | * | 2/2008  | Ku et al.      | 310/68 R |
| 7,847,452 | B2 | * | 12/2010 | Brown          | 310/90 |
| 7,911,089 | B2 | * | 3/2011  | Jang et al.    | 310/43 |
| 8,314,523 | B2 | * | 11/2012 | Lin            | 310/68 B |
| 2003/0057781 | A1 | * | 3/2003 | Shukuri et al. | 310/68 B |
| 2007/0267927 | A1 | * | 11/2007 | Chen          | 310/68 B |

* cited by examiner

*Primary Examiner* — Nguyen N Hanh
(74) *Attorney, Agent, or Firm* — Wang Law Firm, Inc.; Li K. Wang; Stephen Hsu (57) ABSTRACT

A ceiling fan motor has a stator with several coil arms disposed at intervals for the winding of magnetizing coils. Between two adjacent coil arms are formed with a magnetic pole spacer. A supporting base is provided in a predetermined magnetic pole spacer for the disposition of a sensor to detect the position of the rotor.

5 Claims, 8 Drawing Sheets

CEILING FAN MOTOR

CROSS-REFERENCE TO RELATED APPLICATION

This application is a Continuation-In-Part Application of Ser. No. 12/960,769, filed Dec. 6, 2010, and entitled "Fixing structure for the sensor of a ceiling fan", now pending.

BACKGROUND OF THE INVENTION

1. Field of Invention

The invention relates to a ceiling fan motor structure and, in particular, to an improved ceiling fan motor.

2. Related Art

Figure 8:
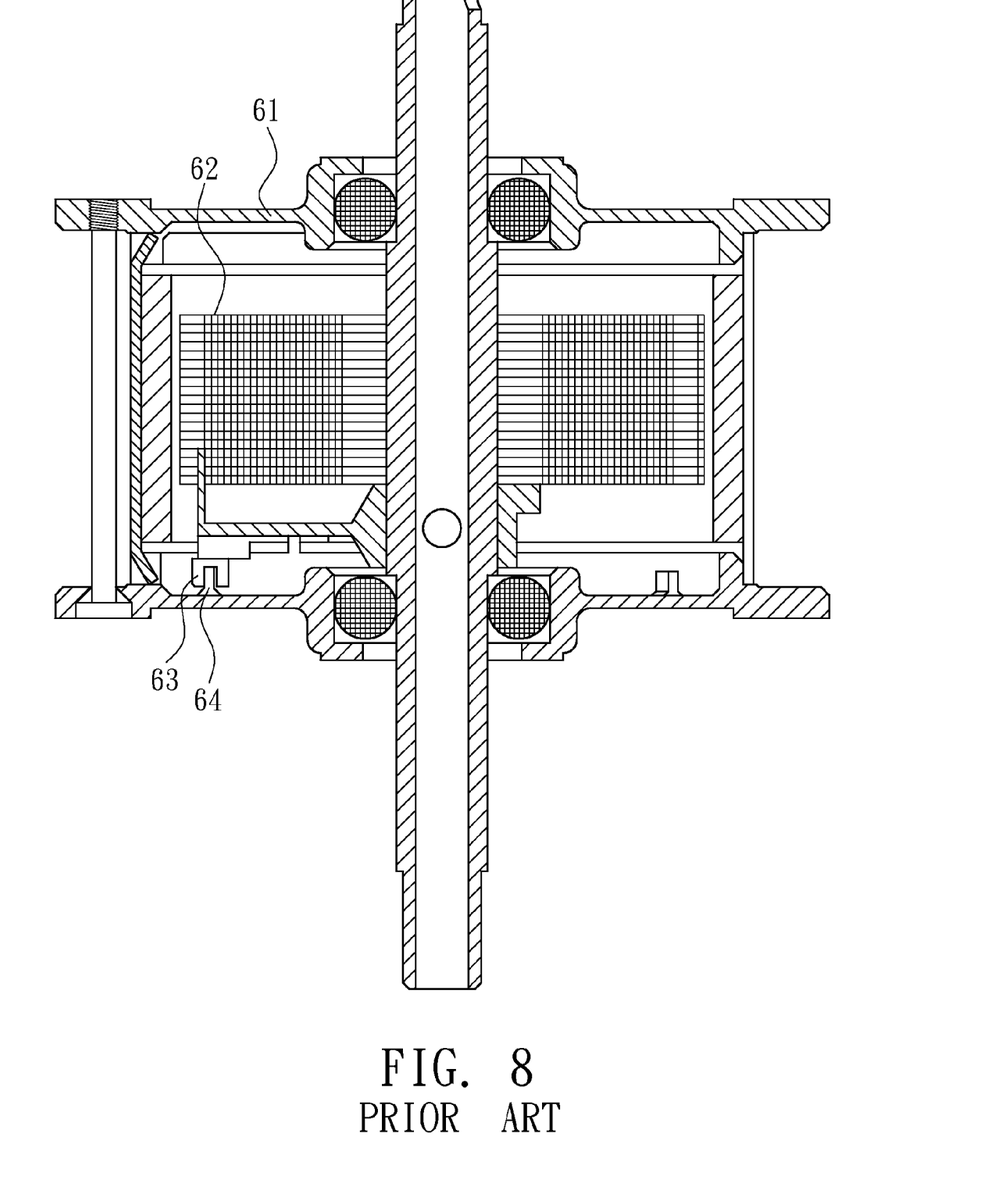
FIG. 8 is a schematic structural view of a conventional ceiling fan motor.

A conventional ceiling fan with an internal sensor, as shown in FIG. 8, has a stator 62 inside a rotor 61. The stator 62 has a photo interrupter 63. The inner wall of the rotor 61 is provided with an interrupting chip 64 corresponding to the photo interrupter 63, thereby replacing the Hall sensor and magnet in usual ceiling fan motors.

However, the assembly procedure of the ceiling fan motor with an internal sensor is complicated. Replacing the magnet with the interrupting chip 64 demands additional positioning. Installing the photo interrupter in the narrow space of the ceiling fan motor is likely to have errors that in turn result in noises due to the friction between the interrupting chip 64 and the photo interrupter 63. Moreover, the ceiling fan motor with an internal sensor has so many elements on the circuit board that the reliability is reduced.

SUMMARY OF THE INVENTION

One objective of the invention is to provide a ceiling fan motor that has a simple structure for easy assembly. Thus, the assembly efficiency can be increased.

Another objective of the invention is to provide a ceiling fan motor that can effectively reduce the sensing error between the sensor and the sending magnet, thereby ensuring the stability of the rotor during its operation.

To achieve the above-mentioned objectives, the disclosed ceiling fan motor includes a motor axle, a stator, and a rotor. The stator consists of a predetermined number of silicate steel plates stacked on the motor axle. The rotor is pivotally installed on the motor axle of the stator. There are a predetermined number of sensing magnets in the rotor disposed around the stator.

The invention is characterized in that the stator has several coil arms disposed at intervals for the winding of magnetizing coils. Between each pair of adjacent coil arms is formed with a magnetic pole spacer. A supporting base is provided in a predetermined magnetic pole spacer for the disposition of a sensor to detect the positions of the sensing magnets of the rotor.

The supporting base consists of two opposite pinching arms at the opening end of the insulating plate in the magnetic pole spacer. The sensor can be correspondingly embedded in the supporting base of the two pinching arms.

Alternatively, the supporting base can consist of two opposite pinching arms glued to a predetermined magnetic pole spacer of the stator. The sensor can be correspondingly embedded in the supporting base of the two pinching arms.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
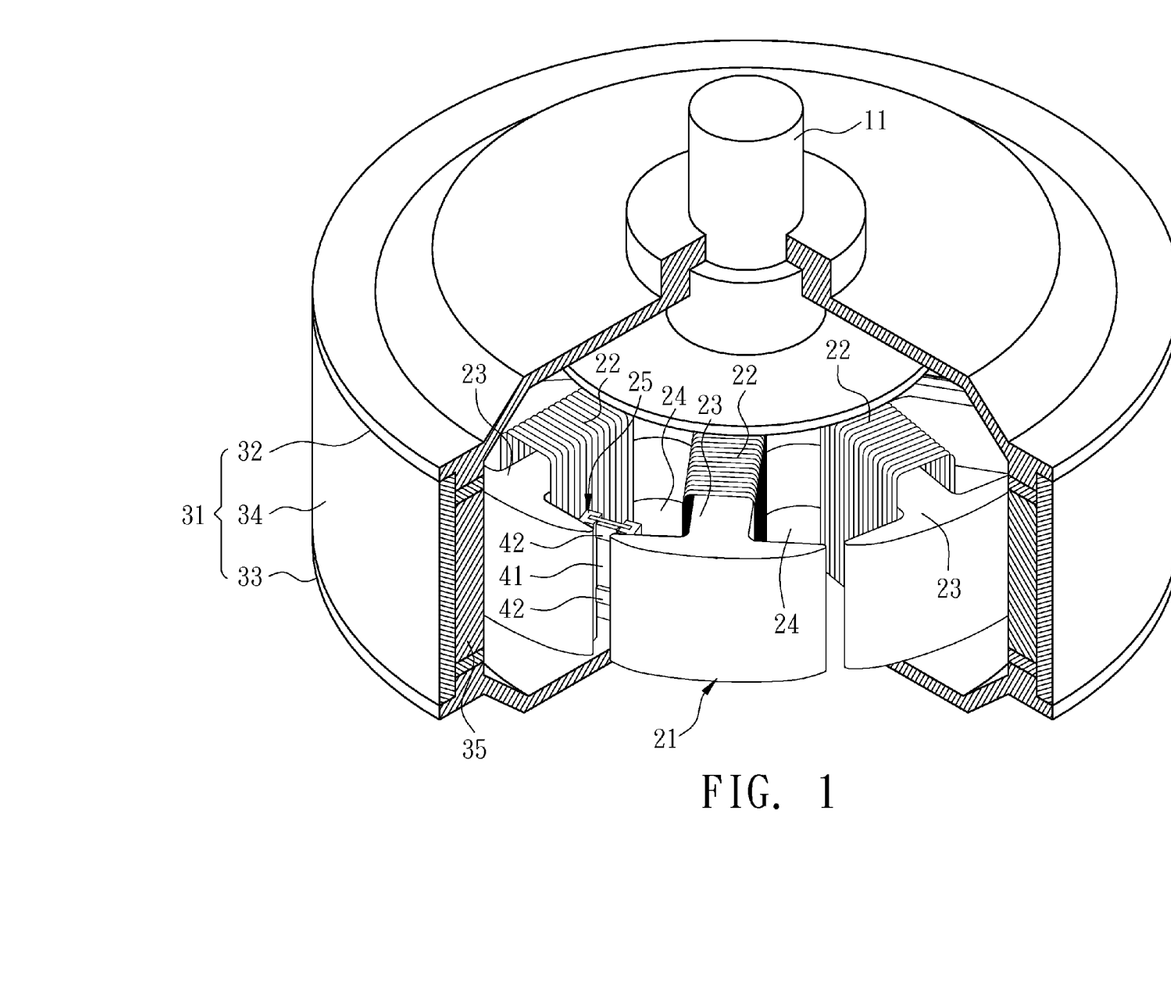
FIG. 1 is a three-dimensional view of the first embodiment of the invention.
Figure 2:
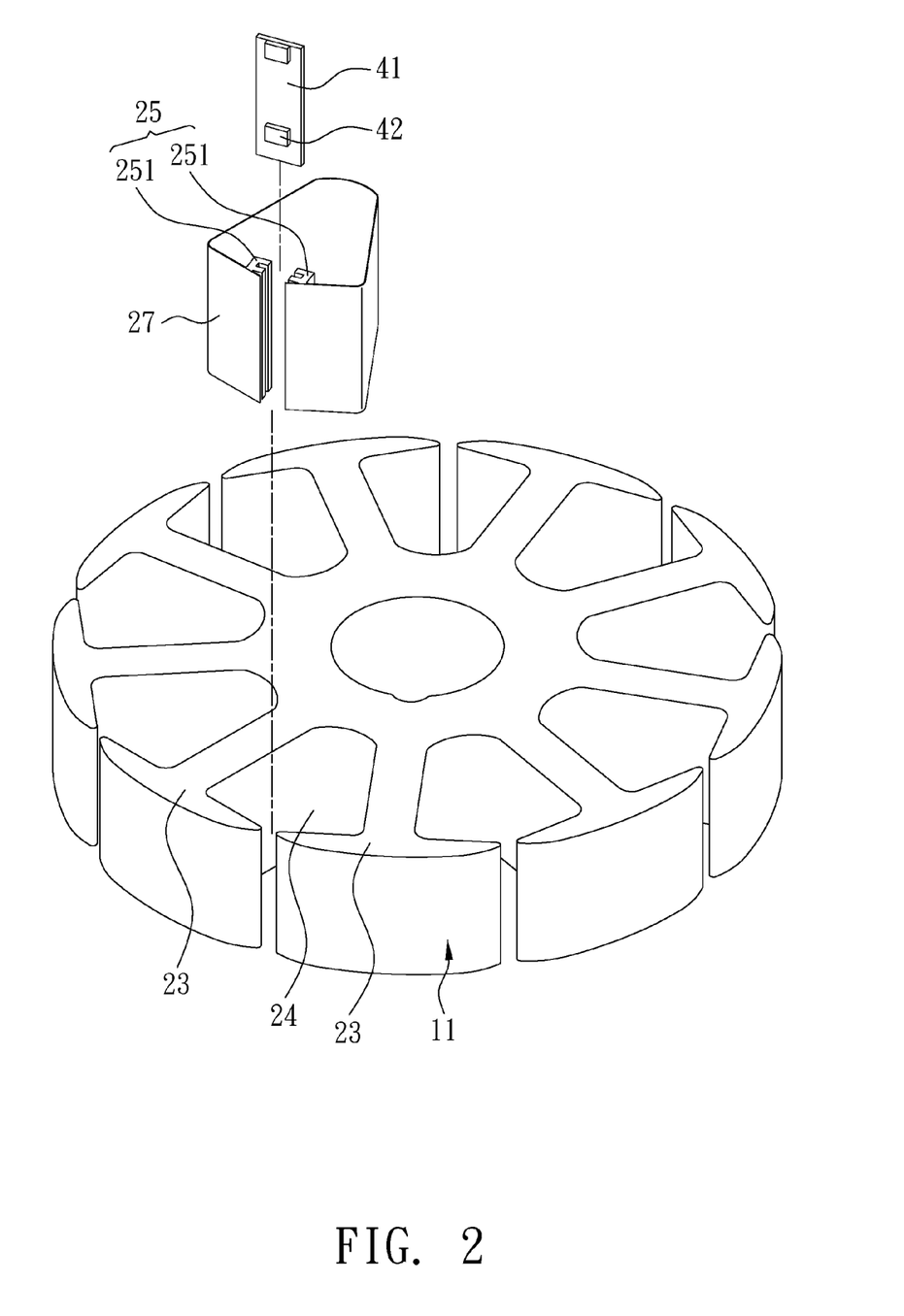
FIG. 2 is a schematic assembly view of the first embodiment.
Figure 3:
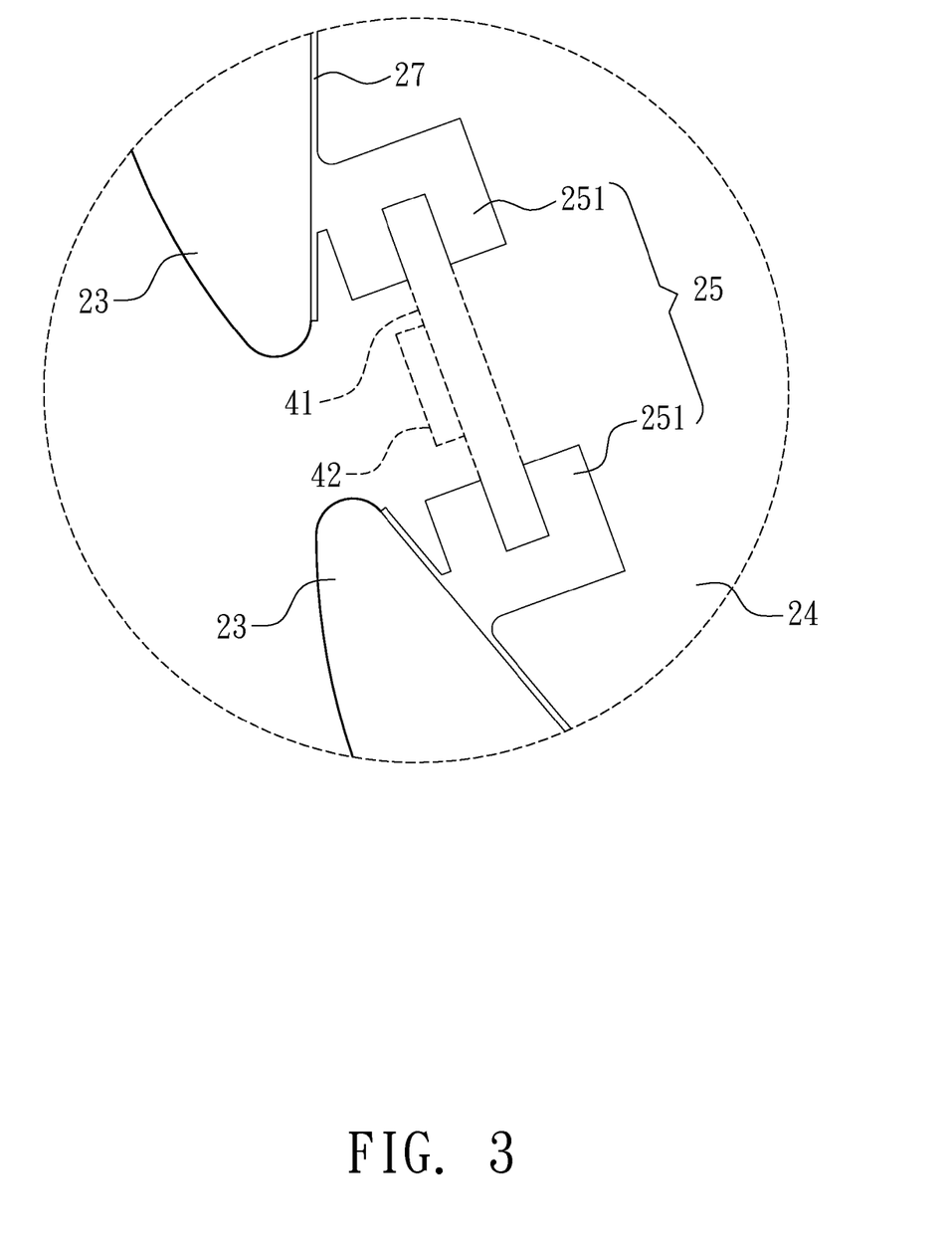
FIG. 3 is a locally enlarged view of the first embodiment after assembly.

Please refer to FIGS. 1 to 3 for a first embodiment of the invention. The ceiling fan motor consists of a motor axle 11, a stator 21, and a rotor 31.

The stator 21 is fixed on the motor axle 11. The stator 2 consists of a predetermined number of silicate steel plates stacked together. The stator 21 has several coil arms 23 disposed at intervals for the winding of magnetizing coils 22. Between each pair of adjacent coil arms 23 is formed with a magnetic pole spacer 24. At least one predetermined magnetic pole spacer 24 is provided with a supporting base 25 for the disposition of a sensor 41. The sensor 41 is electrically connected with a plurality of sensing units 42. In this embodiment, the magnetic pole spacer 24 accommodates a U-shaped insulating plate 27. The opening end of the insulating plate 27 is formed with two opposite pinching arms 251. The supporting base 25 consists of the two opposite pinching arms 251 at the opening end of the insulating plate 27 in the magnetic pole spacer 24. The sensor 41 is correspondingly embedded in the supporting base 25 formed by the two pinching arms 251. The sensor 41 has two sensing units 42.

The rotor 31 is pivotally installed on the motor axle 11 around the stator 21. The rotor 31 consists of an upper shell 32, a lower shell 33, a middle ring 34, and a predetermined number of sensing magnets 35. The sensing magnets 35 are fixed to the inner ring wall of the middle ring 34 and around the stator 21 in order to detecting the sensor 41 in the supporting base 25.

To assemble the above-mentioned embodiment, one only needs to install the insulating plate 27 in the predetermined magnetic pole spacer 24 in advance. The sensor 41 is then correspondingly embedded in the supporting base 25 formed by the opening end of the insulating plate 27. The sensor 41 is firmly position in the supporting base 25 by fitting or additional point gluing. When the sensing magnets 35 rotates with the rotor 31, the sensing units on the sensor 41 detect the positions of the sending magnets 35 of the rotor 31 and transmit a sensing signal to the sensor 41. The sensor 41 drives the magnetizing coil 22 on the stator 21 to produce a sensing magnetic field corresponding to the sensing signal, thereby driving the rotor 31 to keep rotating.

According to the above description, the sensor 41 is disposed in the magnetic pole spacer 24 formed by the adjacent coil arms 23. The space is effectively used without ruining the original structure of the stator 21 or rotor 31. The structure of the invention is simple. In addition to no increase in the extra sensing magnets, the assembly of the invention is also very easy.

The ceiling fan motor in this embodiment has the insulating plate 27 in the predetermined magnetic pole spacer 24. The sensor 41 with the sensing units 41 is then correspondingly embedded in the supporting base 25 formed by the opening end of the insulating plate 27. The sensing units 42 are accurately positioned in the magnetic pole spacer 24. This largely reduces the sensing error between the sensing units 42 and the sensing magnets 35, ensuring the operation stability of the rotor 31.

Figure 4:
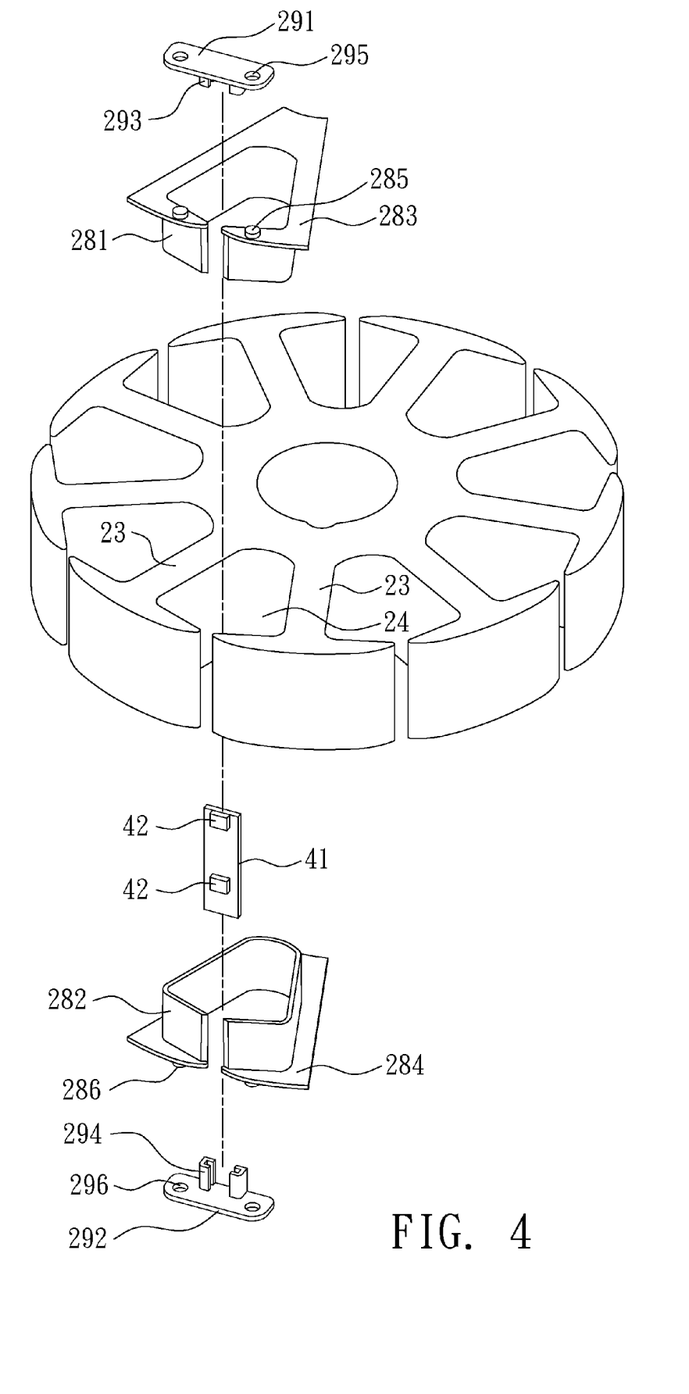
FIG. 4 is a schematic exploded view of the second embodiment of the invention.
Figure 5:
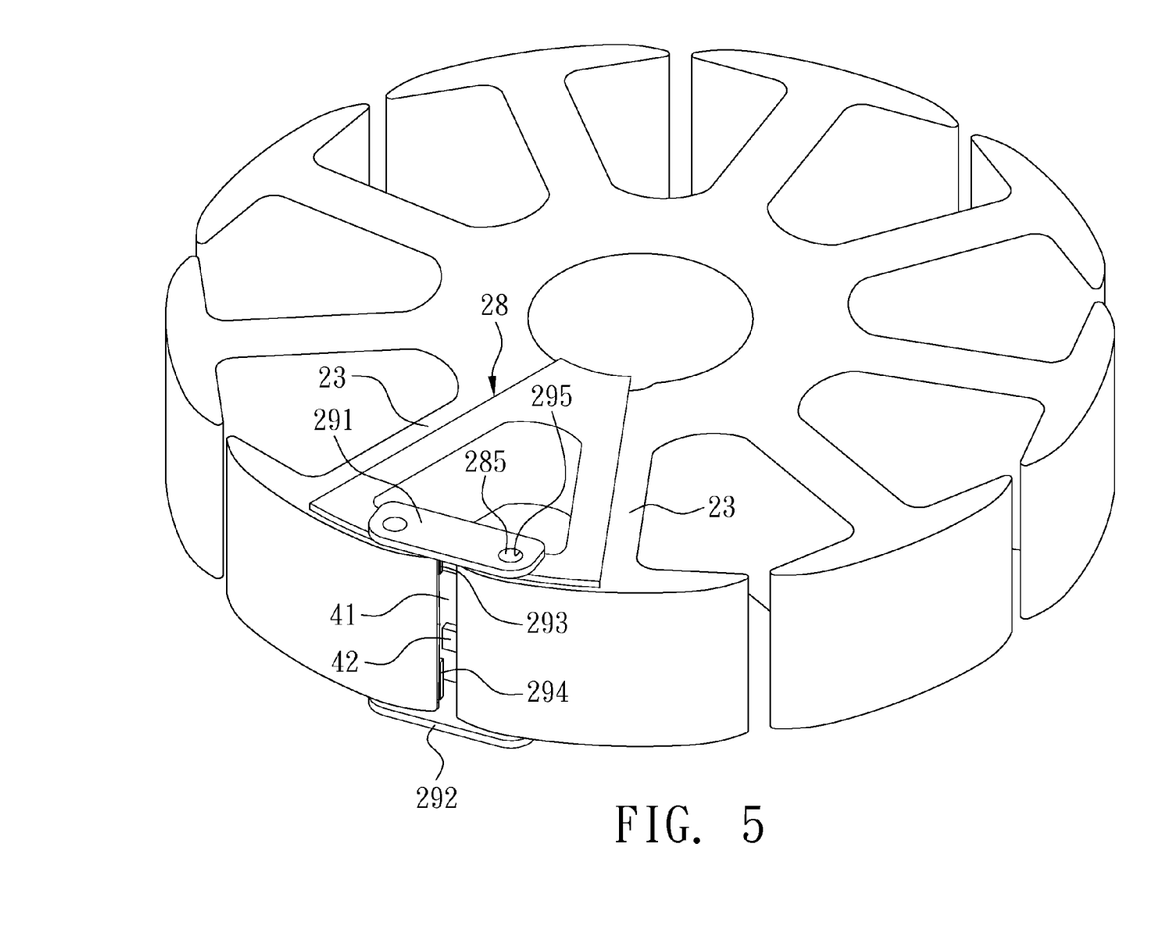
FIG. 5 is a schematic view of the second embodiment after assembly.
Figure 6:
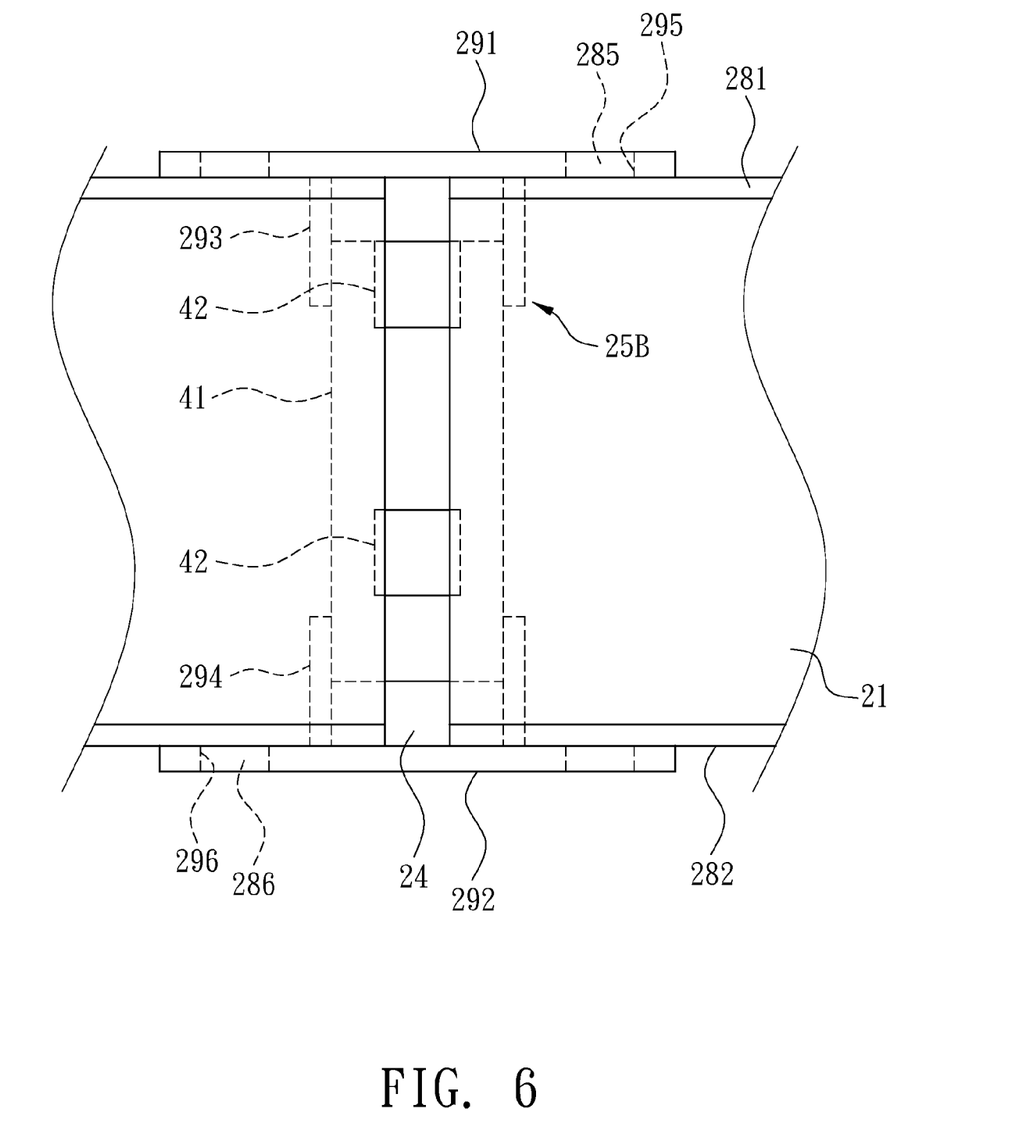
FIG. 6 is a schematic structural view of the second embodiment after assembly.

Please refer to FIGS. 4 to 6 for a second embodiment of the invention. This embodiment differs from the first embodiment in that the U-shaped insulating plate 28 in fact consists of an upper component 281 and a lower component 282. It is accommodated in one of the magnetic pole spacers 24 of the stator 21. The upper component 281 and the lower component 282 further expand to form connecting surfaces 283, 284 that correspondingly connect to the upper and lower end surfaces of the adjacent coil arm 23. The connecting surfaces 283, 284 of the two components 281, 282 have positioning parts 285, 286, respectively, near the two sides of the opening end of the insulating plate 28. The positioning parts 285, 286 on the two components 281, 282 allow the connection to an upper cover 291 and a lower cover 292, respectively. The upper cover 291 extends downward to form two opposite first arms 293. The lower cover 291 extends upward to form two opposite second arms 294. When the two covers 291, 292 are simultaneously connected to the positioning parts 285 286 of the two components 281, 282, the first arms 293 and the second arms 294 are in the magnetic pole spacer 24. The first arms 293 and the second arms 294 thus form the structure of the supporting base 25B for the embedding of the sensor 41. In this embodiment, the positioning parts 285, 286 on the two components 281, 282 are comprised of two protruding pillars at an interval. The two covers 291, 292 are formed with two connecting holes 295, 296 on both sides corresponding to the two protruding pillars. The first arms 293 and the second arms 294 are between the two connecting holes 295, 296 of the two covers 291, 292.

The second embodiment described above also makes good use of the space of the magnetic pole spacer 24 between the adjacent coil arms 23 of the stator 21. Likewise, it achieves the effect of easy assembly and low cost. The sensing error between the sensor 41 and the sensing magnets is reduced as well to ensure the operation stability of the rotor 31.

Figure 7:
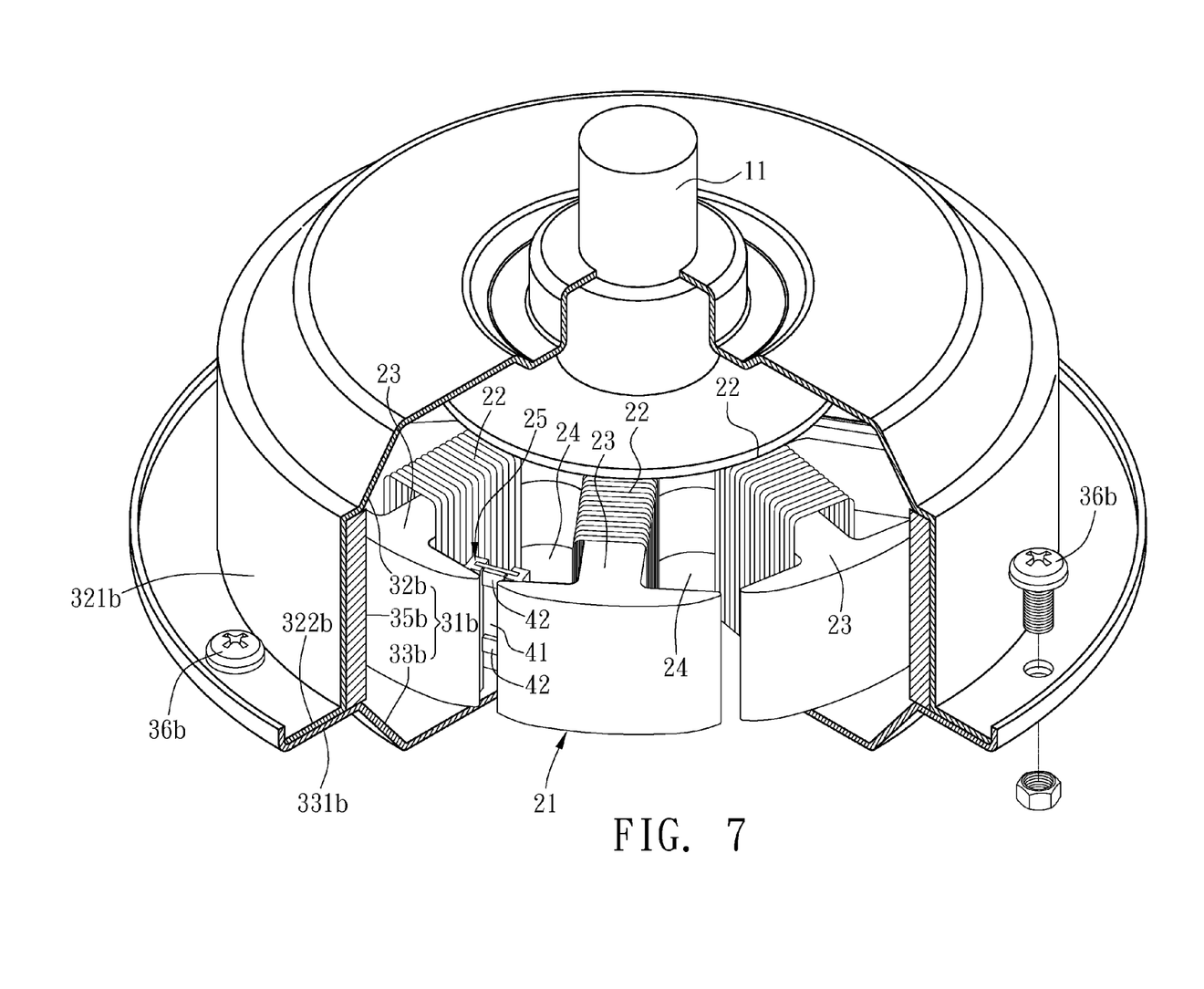
FIG. 7 is a schematic structural view of the third embodiment of the invention.

FIG. 7 shows a third embodiment of the invention. This embodiment differs from the first embodiment in that the rotor 31b is comprised of an upper shell 32b, a lower shell 33b, and a predetermined sensing magnet 35b. The upper shell 32b has an annular wall 321b extending downward. The bottom end of the annular wall 321b is provided with a connecting ring 322b. The sensing magnets 35b are fixed on the inner wall of the annular wall 321b and around the stator 21 in order to interact with the sensor 41 in the supporting base 25. The surrounding edge of the lower shell 33b extends outward to form a connecting part 331b for connecting to the connecting ring 322b on the upper shell 32b. Several locking elements 36 simultaneously go through the connecting ring 322b of the upper shell 32b and the connecting part 331b of the lower shell 33b, thereby connecting the upper and lower shells 32b, 33b.

The third embodiment described above further simplifies the structure of the rotor 31b (no need of the middle ring) to reduce the cost. Besides, the connecting ring 322b of the upper shell 32b and the connecting part 331b of the lower shell 33b are both on the outer side of the rotor 31b. The assembly is thus even easier. The assembly time can be greatly reduced.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A ceiling fan motor comprising a motor axle, a stator and a rotor;
wherein the stator includes a predetermined number of silicate steel plates stacked on the motor axle, the rotor is pivotally installed on the motor axle of the stator and has a predetermined sensing magnets surrounding the stator, and the ceiling fan motor is further characterized in that:
the stator has a plurality of coil arms disposed at interval for the winding of magnetizing coils, a magnetic pole spacer is formed between each pair of adjacent coil arms, a supporting base is provided in a predetermined magnetic pole spacer for accommodating a sensor that detects the positions of the sensing magnets of the rotor, and
the rotor consists of an upper shell, a lower shell, and a predetermined number of sensing magnets; the upper shell has a downward-extending annular wall, the bottom of which is provided with a connecting ring; the sensing magnets are fixed on the inner wall of the annular wall and correspondingly around the stator; the edge of the lower shell extends outward to form a connecting part correspondingly connecting to the connecting ring of the upper shell; and a plurality of locking elements go through the connecting ring of the upper shell and the connecting part of the lower shell, thereby connecting the upper and lower shells.

2. The ceiling fan motor of claim 1, wherein the sensor is electrically connected with a plurality of sensing units for receiving a sensing signal detected by the sensor.

3. The ceiling fan motor of claim 1, wherein the magnetic pole spacer accommodates a U-shaped insulating plate; the opening end of the insulating plate is formed with two opposite pinching arms; the supporting base is comprised of the two opposite pinching arms at the opening end of the insulating plate in the magnetic pole spacer; and the sensor is correspondingly embedded in the supporting base formed from the two pinching arms.

4. The ceiling fan motor of claim 1, wherein the magnetic pole spacer correspondingly accommodates a U-shaped insulating plate composed of an upper component and a lower component in a magnetic pole spacer of the stator; the upper component and the lower component extend to form connecting surfaces to correspondingly connect to the upper and lower end surfaces of the adjacent coil arm; both sides of the connecting surfaces of the two components near the opening end of the insulating plate have a positioning part, respectively; the positioning parts of the two components enables the connection of an upper cover and a lower cover; the upper cover extends downward to form two opposite first arms, and the lower cover extends upward to form two opposite second arms; and when the two covers are simultaneously connected to the positioning parts of the two components, the first arms and the second arms are in the magnetic pole spacer to form the supporting base for the disposition of the sensor.

5. The ceiling fan motor of claim 4, wherein the positioning parts of the two components are two protruding pillars at an interval; both sides of the two covers are formed with two connecting holes corresponding to the two protruding pillars; and the first arms and the second arms are between the two connecting holes of the covers.

\* \* \* \* \*